(12) United States Patent
Marchese (10) Patent No.: US 6,616,166 B2
(45) Date of Patent: Sep. 9, 2003

(54) BOAT GUIDING MEANS (76) Inventor: Robert Marchese, 153 Market Street, Thunder Bay, Ontario (CA), P7A 8A4

( * ) Notice: Subject to any disclaimer, the term of this patent is extended or adjusted under 35 U.S.C. 154(b) by 0 days.

(21) Appl. No.: 10/133,134

(22) Filed: Apr. 26, 2002

(65) Prior Publication Data

US 2003/0137124 A1 Jul. 24, 2003

(30) Foreign Application Priority Data

Jan. 18, 2002 (CA) .............................................. 2368507

(51) Int. Cl.⁷ ................................................ B60P 3/10
(52) U.S. Cl. .................................... 280/414.1; 414/482
(58) Field of Search ....................... 280/414.1; 414/482, 414/483; 114/344

(56) References Cited

U.S. PATENT DOCUMENTS

| | | | | | |
|---|---|---|---|---|---|
| 3,021,969 A | * | 2/1962 | Peake et al. ................... | 214/84 |
| 3,447,815 A | * | 6/1969 | West .......................... | 280/144 |
| 4,010,962 A | * | 3/1977 | Groblebe ................. | 280/414 R |
| 4,099,279 A | * | 7/1978 | Park ............................... | 9/12 |
| 4,197,050 A | * | 4/1980 | Larson ........................ | 414/529 |
| 4,340,332 A | | 7/1982 | Davies ........................ | 414/467 |
| 4,395,185 A | | 7/1983 | Whaley ....................... | 414/483 |
| 4,715,768 A | * | 12/1987 | Capps ......................... | 414/535 |
| 5,004,260 A | | 4/1991 | Smyly, Sr. ................. | 280/414.1 |
| 5,013,206 A | | 5/1991 | Ernst et al. .................. | 414/483 |
| 5,165,706 A | | 11/1992 | Fond ......................... | 280/414.1 |
| 5,228,713 A | | 7/1993 | Kovach .................... | 280/414.1 |
| 5,332,249 A | | 7/1994 | Solberg et al. ........... | 280/414.1 |

* cited by examiner

Primary Examiner—Lesley D. Morris
Assistant Examiner—Tony Winner
(74) Attorney, Agent, or Firm—Kolisch Hartwell, P.C.

(57) ABSTRACT

A boat guiding means comprising two boat guiding mechanisms that are attachable near the rear of each side of a standard boat trailer. When the trailer is backed down a boat ramp into the water (with or without the boat), buoyant guiding arms on the guiding mechanisms pivot upward so the guiding arms remain approximately parallel to and near the surface of the water when the trailer has been submerged to an appropriate depth for loading or unloading a boat. The guiding arms thus provide a guiding surface near the rear of both sides of the trailer to prevent the stern of the boat from wandering during loading or unloading of the boat from the trailer.

24 Claims, 10 Drawing Sheets

BOAT GUIDING MEANS

FIELD OF THE INVENTION

The present invention is related to the field of boat trailers and equipment for loading and unloading boats from boat trailers. More particularly, the present invention is related to the field of boat trailers and equipment for guiding boats during loading and unloading from boat trailers.

BACKGROUND OF THE INVENTION

A boat trailer is usually used to transport a boat over land. A standard boat trailer consists of a frame, two or more wheels attached to the frame, and a winch stand near the front of the trailer which supports a winch and cable system. A number of rubber rollers on the frame facilitate loading and unloading the boat from the trailer and secure the boat on the trailer during transport.

A boat ramp is ordinarily used for loading a boat from the water onto the trailer or unloading a boat from the trailer into the water. In fact, most boating facilities are equipped with at least one boat ramp. A boat ramp has a surface (usually paved) that gradually slopes toward the water and for some distance below the surface of the water. A boat dock is usually installed on at least one side of and parallel to the boat ramp.

To load a boat from the water onto the trailer, the driver of the vehicle backs the trailer down the boat ramp into the water until the trailer reaches an appropriate depth. The boat is usually tied to the dock at this point. The appropriate depth for the trailer is often difficult to determine, and may only be learned through trial and error or experience. In any event, when the trailer is at an appropriate depth, the front of the trailer and winch stand are usually just above the surface of the water while the rear of the trailer is submerged well below the surface.

The boat is guided from the dock toward the trailer, and the bow of the boat is connected to the winch cable. At this point, the bow usually engages the rollers near the front of the trailer as they are either just below or just above the surface of the water. However, the stern does not engage the rollers at the back of the trailer as these rollers are too deep in the water. As a result, there is nothing on a standard boat trailer to restrict the movement of the stern of the boat, and it is free to wander to one side or the other. This wandering makes the boat difficult to control, and can make loading the boat a difficult task, especially for a single person, and especially in adverse conditions, such as windy or rough weather, or where the boat ramp slopes to one side or the other.

The boat is then pulled by the winch until the bow engages a roller on the winch stand. At this point, the stern of the boat still may not engage the rollers at the back of the trailer. The stern must be centered on the trailer as best as possible, after which time the driver pulls the trailer out of the water. As the trailer is pulled from the water, the stern of the boat will settle on the rollers at the back of the trailer. However, if the stern was not centered correctly, it might not properly engage those rollers. The trailer would then have to be backed into the water, and the above procedure repeated. This could take several attempts, depending on the experience of the driver and/or the conditions at the boat ramp.

To unload a boat from a boat trailer into the water, the driver of the vehicle backs the trailer down the boat ramp until the trailer reaches an appropriate depth. Again, this depth can be difficult to determine. Once the trailer has been submerged, the stern of the boat will float above the rollers at the back of the trailer, and may wander to one side or the other. The winch is released and the boat is slid along the rollers until the entire boat is disengaged from the rollers. At this point, the entire boat may wander. If the boat wanders away from the dock, it can be difficult to retrieve.

A number of solutions to the problems associated with loading and unloading boats from trailers have been proposed. For example, U.S. Pat. No. 4,340,332 issued on Jul. 20, 1982 to Davies describes two quadrilateral shaped gates which are pivotally attachable to the rear corners of a boat trailer. With the trailer on a boat ramp out of the water, the boom gates are manually pivoted from a forward transporting position alongside the trailer to a rearward guiding position out over the water and alongside a floating boat. Once the boat is loaded, the gates are manually pivoted back to the transporting position. As described above, the gates must be manually operated in order for the invention to function. U.S. Pat. No. 5,165,706 issued on Nov. 24, 1992 to Fond describes a boat-shaped guide having a closed and an open end, the closed end being pivotally attachable to the front of a boat trailer. The guide is biased by an elevation means such as a gas charged cylinder or a coil spring so as to elevate relative the trailer. When the boat is resting on the guide, the elevation means is overcome and the guide remains in a lowered position. When the weight of the boat is removed, the elevation means causes the guide to elevate. The elevated guide helps keep the boat centered in the water during loading and unloading from the trailer. However, it should be noted that this guide is not easily adaptable to fit boats of various shapes and sizes. In addition, a specialized winch stand must replace the standard winch stand of the trailer in order to accommodate the elevation means.

In addition, a number of specialized boat trailers have been described. U.S. Pat. No. 5,228,713 issued on Jul. 20, 1993 to Kovach, U.S. Pat. No. 5,013,206 issued on May 7, 1991 to Ernst et al., U.S. Pat. No. 5,332,249 issued on Jul. 26, 1994 to Solberg et al., U.S. Pat. No. 4,395,185 issued on Jul. 26, 1983 to Whaley and U.S. Pat. No. 5,004,260 issued on Apr. 2, 1991 to Smyly, Sr. each describes specialized boat trailers. These trailers often involve complicated mechanisms, and can be difficult to operate and expensive to purchase.

SUMMARY OF THE INVENTION

In a broad aspect, the present invention provides a trailer-mounted boat guiding means for keeping a boat centered in the water in relation to a boat trailer during loading and unloading of said boat from said trailer, said boat guiding means comprising a left and right boat guiding mechanism attachable to a left and a right side of said trailer respectively, each of said boat guiding mechanisms comprising a trailer attachment means for attaching said boat guiding mechanism to a side of said trailer, a supporting member having a first end and a second end, said first end being connected to said trailer attachment means, and said second end being displaced outwardly and upwardly relative to said first end, a guiding arm pivotally connected to said second end of said supporting member to allow said guiding arm to pivot upwardly from a transport position to a boat guiding position, and a flotation means associated with said guiding arm, wherein said flotation means is of sufficient buoyancy, and is so associated with said guiding arm, so as to cause said guiding arm to pivot upwardly from the transport position to the boat guiding position when said trailer is submerged in the water for loading or unloading said boat from said trailer.

In one embodiment, the position of the guiding arms on the guiding mechanisms are adjustable in three dimensions relative to the boat trailer to ensure that the present invention can be used with boats of varying shapes and sizes. Similarly, the means of attaching the present invention to the boat trailer is also adjustable to ensure the present invention is attachable to most standard boat trailers.

In another embodiment, the boat guiding mechanisms have a stopping means for controlling downward rotation of the guiding arms relative to the supporting members past the stopping means. As a result, the downward rotation of the guiding arms can be controlled.

There is further provided a boat trailer, comprising a boat frame, a vehicle attachment means connected to said frame, a plurality of wheels connected to said frame, and a left and right boat guiding mechanism near the rear of each of a left and right side of said frame respectively, for keeping a boat centered in the water during loading and unloading of said boat from said trailer, each of said boat guiding mechanisms comprising a supporting member having a connected end and a second end, said connected end being attached to said frame, and said second end being displaced outwardly and upwardly relative to said connected end, a guiding arm pivotally connected to said second end of said supporting member to allow said guiding arm to pivot upwardly from a transport position to a boat guiding position, and a flotation means associated with said guiding arm, wherein said flotation means is of sufficient buoyancy, and is so associated with said guiding arm, so as to cause said guiding arm to pivot upwardly from the transport position to the boat guiding position when said trailer is submerged in the water for loading or unloading said boat from said trailer.

The present invention is an important improvement upon other boat guiding means described above in that it is simple and inexpensive to construct, easy to operate and attachable to most standard boat trailers. In addition, if brightly coloured, the flotation means and/or guiding arms can act as indicators to the driver that the boat trailer has reached an acceptable depth in the water for loading or unloading the boat. When the guiding arms begin to float approximately parallel to and near the surface of the water, the trailer has reached an acceptable depth. Finally, depending on the material selected, the flotation means can also act as a bumper to prevent damage to the boat from contact with the guiding arms.

BRIEF DESCRIPTION OF THE DRAWINGS

Having generally described the nature of the invention, preferred embodiments will now be described with reference to the accompanying drawings, in which.

DESCRIPTION OF PREFERRED EMBODIMENTS

Figures 1, 2:
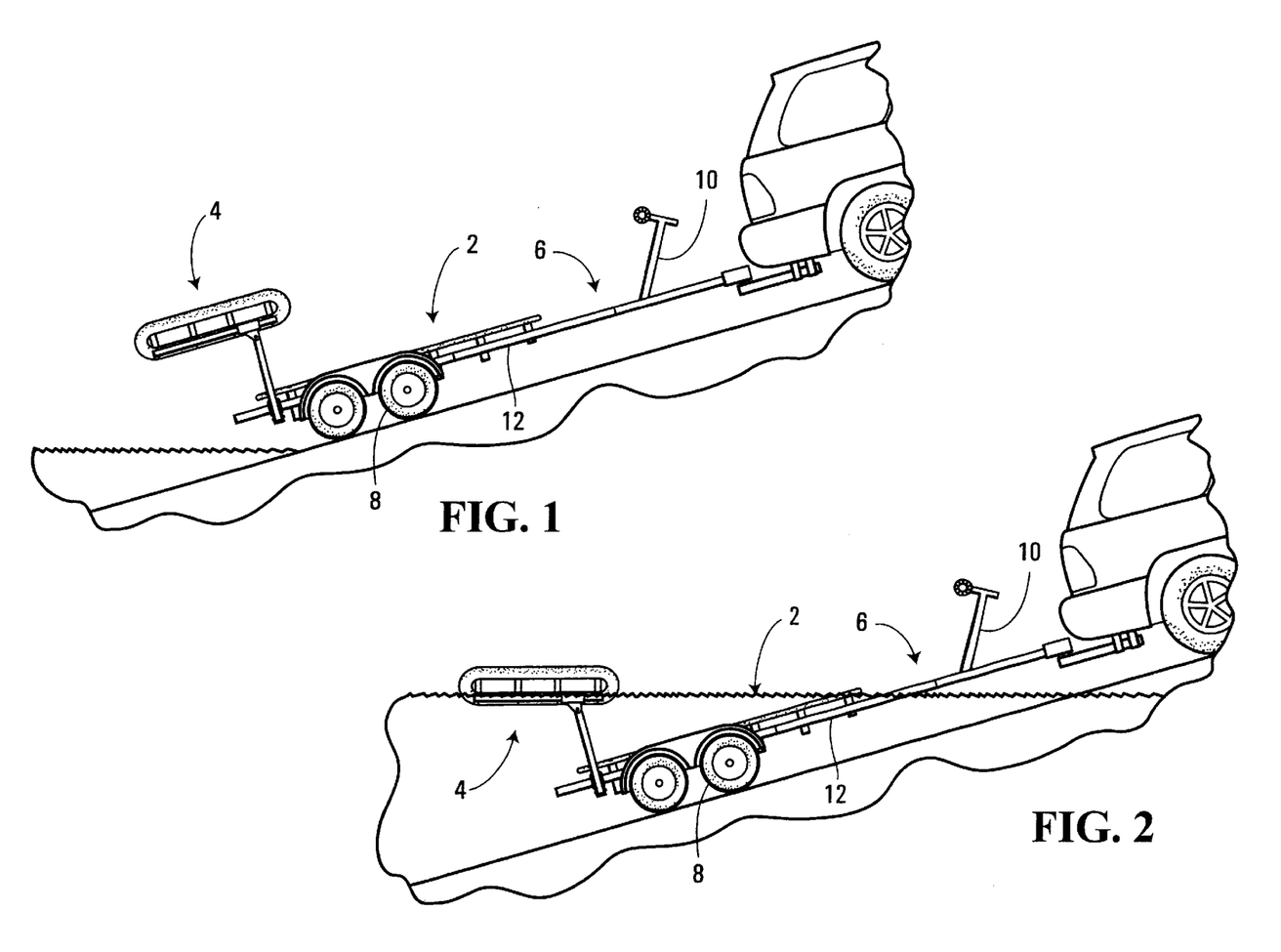
FIG. 1 is a side view of a standard boat trailer equipped with an embodiment of the guiding mechanisms of the present invention. The near guiding mechanism (shown) is obstructing the view of the far guiding mechanism (not shown).
FIG. 2 is a side view of the trailer in FIG. 1, after having been submerged in the water.

The particularly illustrated embodiments are described in this section with reference to the drawings. FIG. 1 shows a standard boat trailer 2 which has been equipped with a preferred embodiment of the guiding mechanisms 4 of the present invention. The boat trailer consists of a boat-shaped frame 6, two or more wheels 8 attached to the frame, and a winch stand 10 near the front of the trailer which supports a winch and cable system. The boat shaped frame 6 comprises two side rails 12 along each side of the trailer which meet at a point near the front of the trailer, and which are connected to one another by several cross rails (not shown). A number of rubber rollers (not shown) on the side rails and cross rails, from the front of the trailer to the rear, facilitate loading and unloading the boat from the trailer, and secure the boat on the trailer during transport. The guiding mechanisms 4 are attached to the side rails 12 near the rear of each side of the boat trailer 2. The near guiding mechanism 4 (shown) is obstructing the view of the far guiding mechanism (not shown).

In FIG. 2, the boat trailer depicted in FIG. 1 has been submerged in the water so that the trailer is in a pre-loading or post-unloading position.

FIGS. 3 to 12 depict various embodiments of one of the two guiding mechanisms of the present invention. It will be generally understood that in each case the opposite guiding mechanism (not shown) is a mirror image of that depicted in FIGS. 3 to 12.

Figure 3:
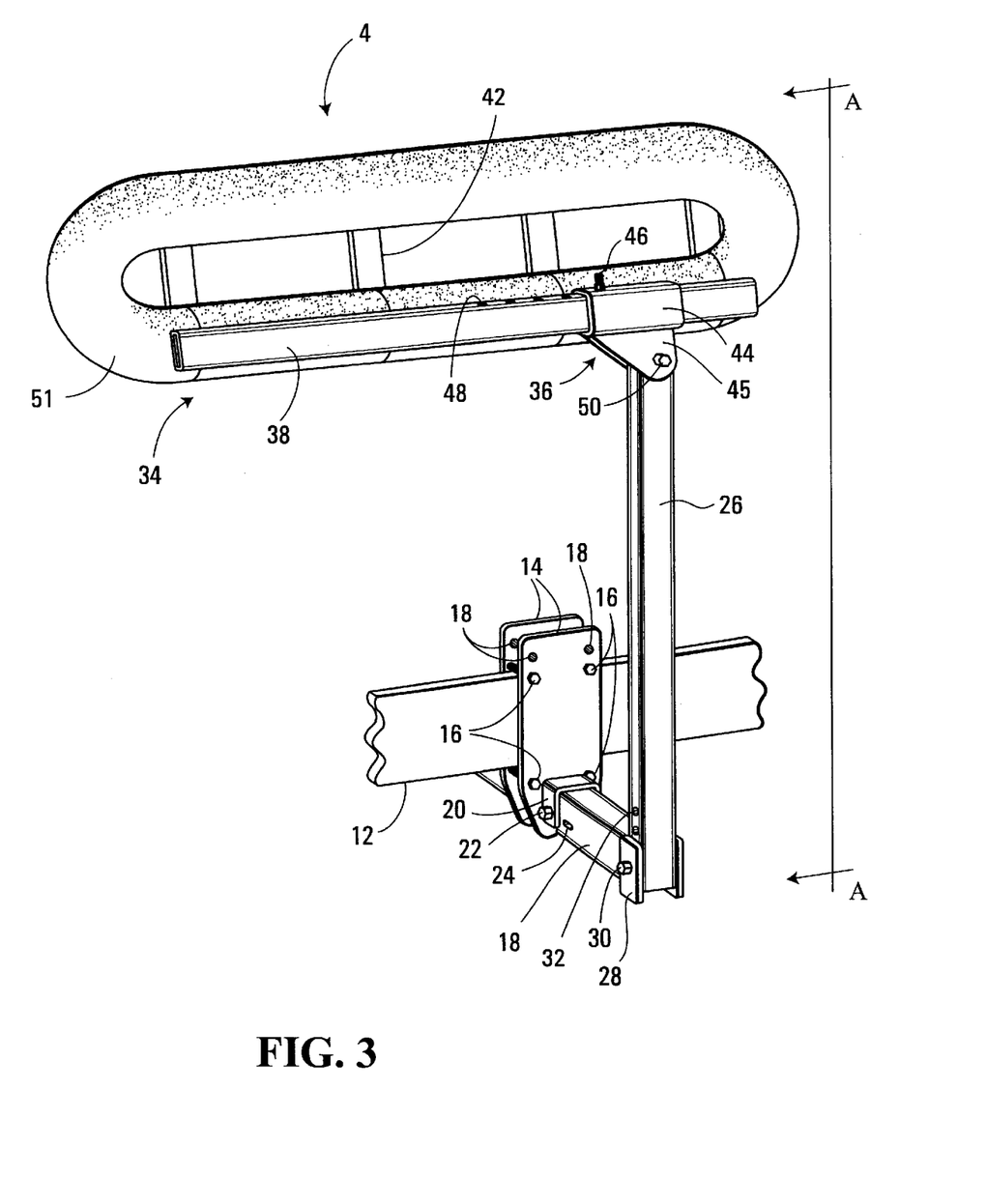
FIG. 3 is a side perspective view of the near guiding mechanism depicted in FIGS. 1 and 2.
Figure 4:
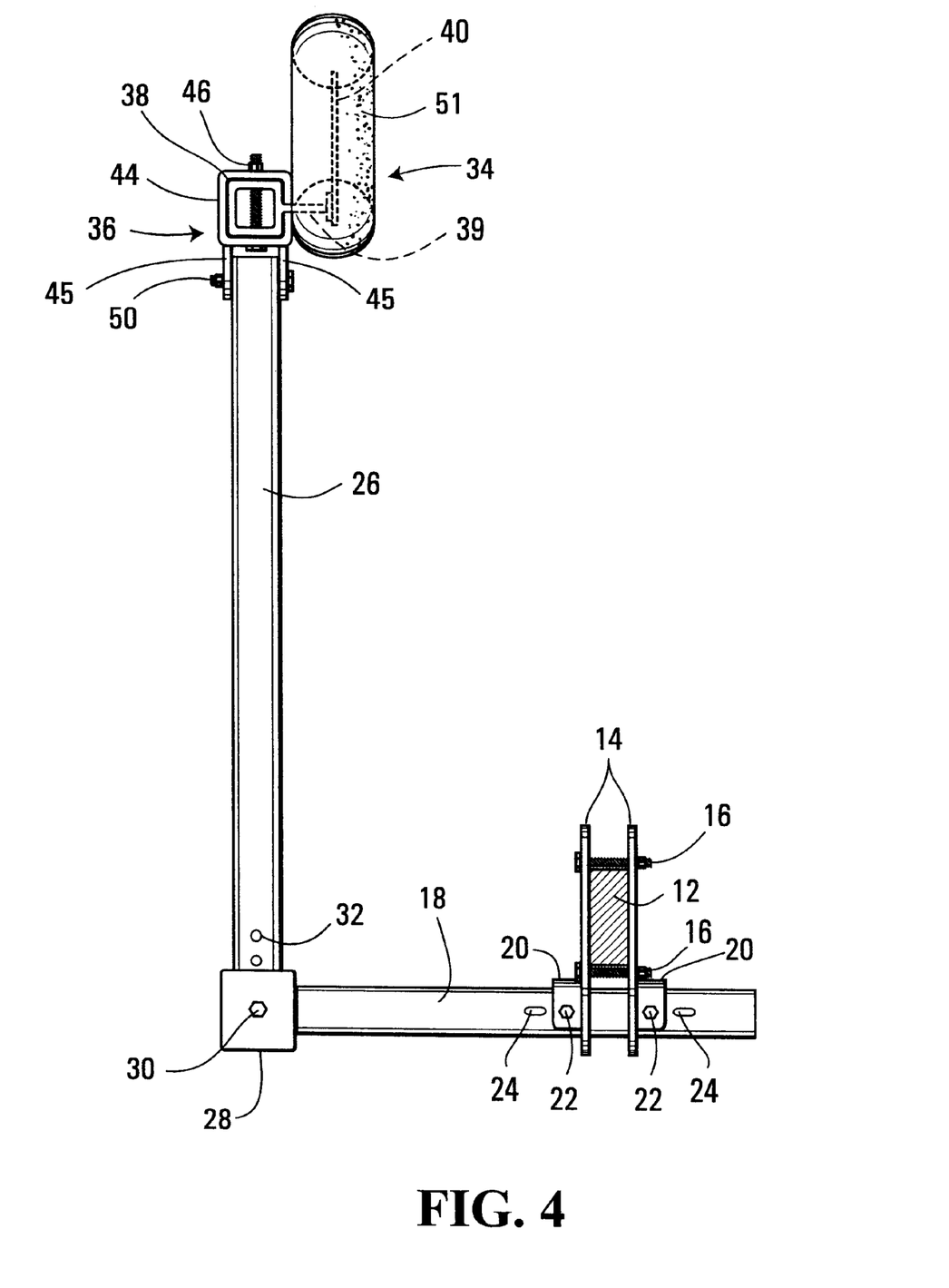
FIG. 4 is an end view of the guiding mechanism of FIG. 3 taken along line A—A.

With reference to FIGS. 3 and 4, the guiding mechanism 4 of the preferred embodiment consists of a pair of mounting plates 14 placed on opposite sides of the side rail 12 of the boat trailer near the rear of the trailer. One or more bolts 16 through the mounting plates 14 are used to hold the mounting plates in place on the side rail 12. The bolts 16 will be of sufficient length to be able to accommodate side rails 12 of various widths. A series of holes 18 are drilled in the mounting plates 14 to allow for attachment of the mounting plates to side rails 12 of various heights. In the embodiment shown, the mounting plates 14 are placed on the left and right side of the side rail 12. However, as discussed in more detail below, a modified version of the mounting plates may alternatively be placed on the top and bottom of the side rail.

A substantially horizontal spacer bar 18 with an inner end and an outer end is connected to the mounting plates 14. In the embodiment shown, the lower ends of the mounting plates 14 have sleeves 20 adapted to receive the inner end of the spacer bar 18. One or more bolts 22 pass through the sleeves 20 and spacer bar 18 to hold the bar in place. A series of elongated holes 24 are drilled in the spacer bar 18 to allow for inward or outward adjustment of the spacer bar 18 relative to the mounting plates 14. Thus, the position of the spacer bar is easily adjustable relative to the boat trailer, which helps ensure that the guiding mechanisms will be able to accommodate boats of various shapes and sizes. The holes are elongated to ensure that the mounting plates 14 will be able to accommodate side rails 12 of various widths when the spacer bar 18 is attached. In the alternative, one or two highly elongated slots in the spacer bar 18 could be used.

A substantially vertical support post 26 with a top end and a bottom end is connected at its bottom end to the outer end of the spacer bar 18. In the embodiment shown, a sleeve 28 at the outer end of the spacer bar 18 is adapted to receive the bottom end of the support post 26. A bolt 30 passes through the sleeve 28 and support post 26 to hold the post in place. A series of holes 32 are drilled along the support post 26 to enable the elevation of the support post to be adjustable relative to the spacer bar 18. This allows for the elevation of the support post to be easily adjustable relative to the boat trailer, and helps ensure that the guiding mechanisms will be able to accommodate boats of various shapes and sizes.

A guiding arm 34 is connected to the top end of the support post 26 by means of a hinge bracket 36. In the embodiment shown, the guiding arm consists of an elongated bracket-receiving bar 38 attached by means of a connection flange 39 to a flotation support frame 40. The flotation support frame 40 comprises an upper and lower horizontal flotation support (not shown) connected by a series of vertical flotation supports 42. The hinge bracket 36 comprises a sleeve 44 having an inward and outward side, adapted to receive the bracket-receiving bar 38 of the guiding arm 34. A bolt 46 passes through the sleeve 44 and bracket-receiving bar 38 of the guiding arm 34 to hold the arm in place. A series of holes 48 in the bracket-receiving bar 38 of the guiding arm 34 are capable of receiving the bolt 46. This allows for the position of the guiding arm 34 to be easily adjustable forwardly or rearwardly relative to the boat trailer. Two substantially parallel downward projections 45 extend downward from the inward and outward side of the sleeve 44 of the hinge bracket 36 and are adapted to receive the top end of the support post 26. The hinge bracket 36 is pivotally connected to the top end of the vertical support post 26 by means of a hinge pin 50 inserted through the downward projections 45 and support post 26. The guiding arm 34 is thus able to pivot upwardly or downwardly relative to the support post 26 about the hinge pin 50.

A flotation element 51 is associated with the guiding arm 34 so as to cause the guiding arm 34 to pivot upward relative to the support post 26 so that it remains approximately parallel to and near the surface of the water when the trailer has been submerged to an appropriate depth for loading or unloading a boat. This association could be the attachment of the flotation element to the guiding arm, as in the embodiment depicted, where segments of foam tubing have been attached to the flotation support frame 40 of the guiding arm 34. In the place of foam tubing, air filled or rubber bumpers, Styrofoam segments, and the like, would also be acceptable. Alternatively (not shown), the association of the flotation element with the guiding arm could be the incorporation of the flotation element within the guiding arm. This could include placing the flotation element, such as air, another gas, or foam, inside the guiding arm. Finally, the association of the flotation element with the guiding arm could be the incorporation of the flotation element as part of the guiding arm or as the guiding arm itself (not shown). This would include an embodiment where the guiding arm was constructed partly or entirely of a buoyant material.

Figure 5:
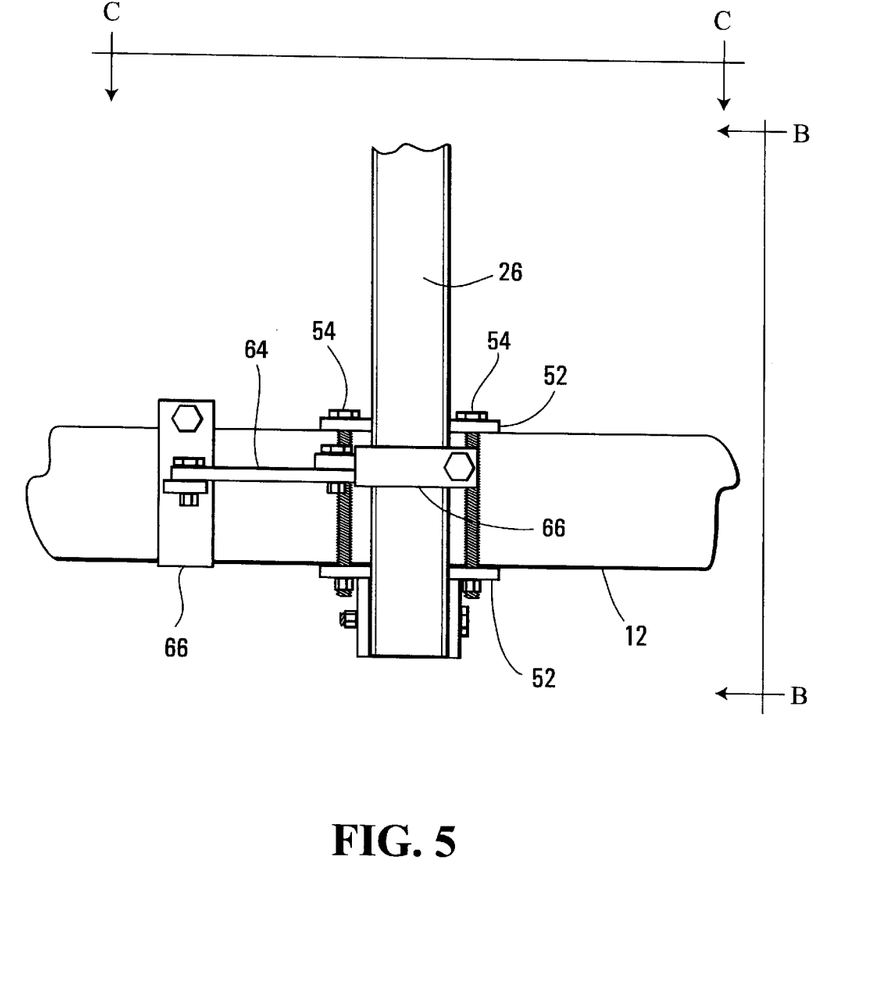
FIG. 5 is a side fragmentary view of a lower portion of another embodiment of the guiding mechanism of the present invention.
Figure 6:
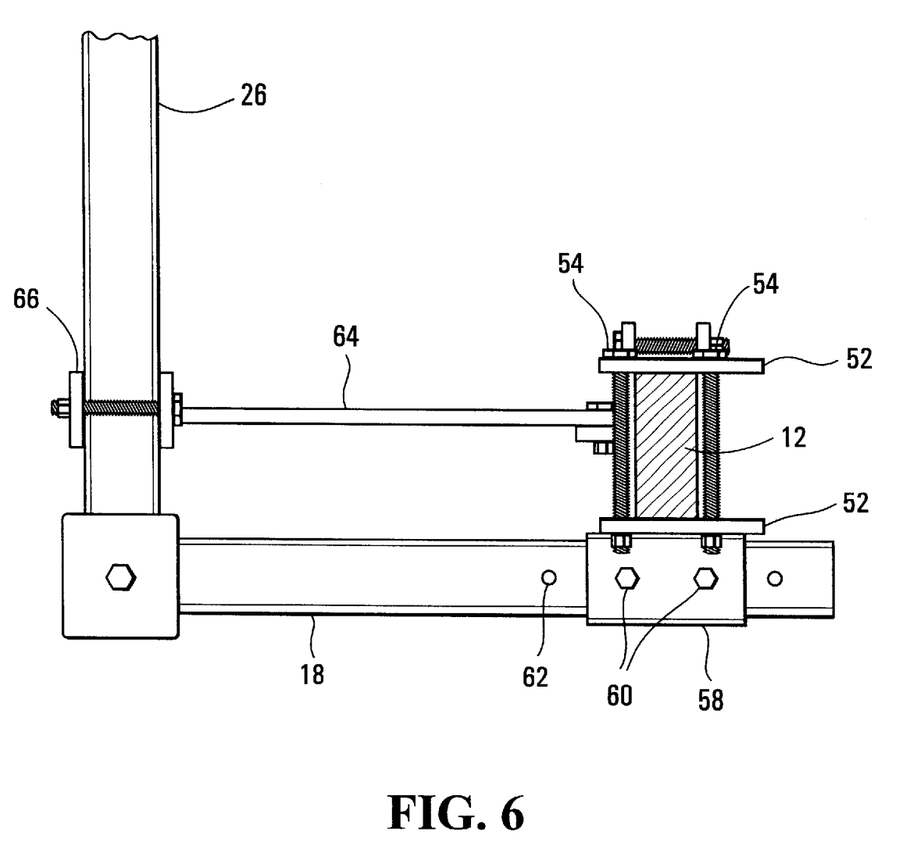
FIG. 6 is an end fragmentary view of the guiding mechanism of FIG. 5 taken along line B—B.
Figure 7:
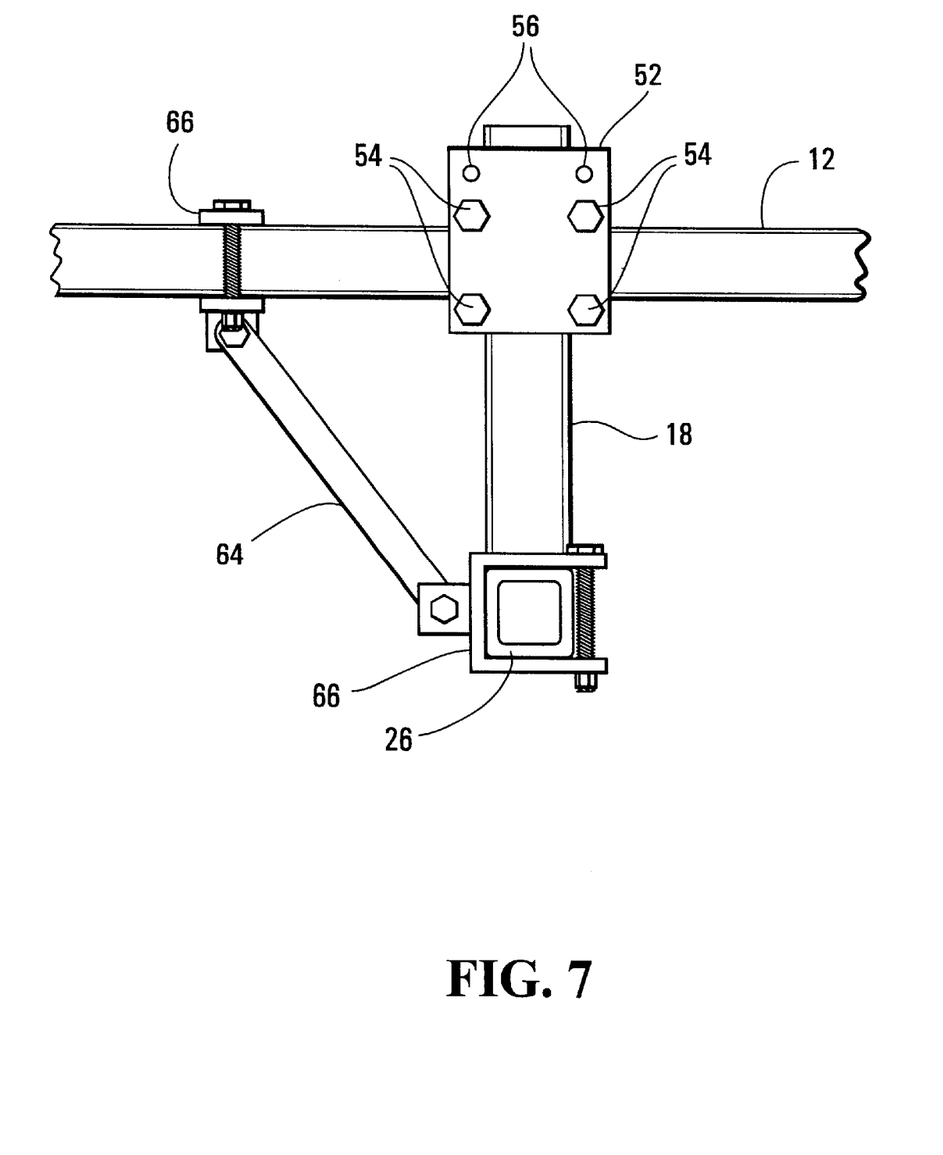
FIG. 7 is a top fragmentary view of the guiding mechanism of FIG. 5 taken along line C—C.

In FIGS. 5, 6 and 7, an alternative embodiment is shown. In FIGS. 5, 6 and 7, the spacer bar 18 is connected to the side rail 12 of the boat trailer by upper and lower horizontal mounting plates 52. The mounting plates 52 are placed above and below the side rail 12 of the boat trailer near the rear of the trailer. One or more bolts 54 through the mounting plates 52 are used to hold the mounting plates in place on the side rail 12. The bolts 54 will be of sufficient length to be able to accommodate side rails 12 of various heights. A series of holes 56 are drilled in the mounting plates 52 to allow for attachment of the mounting plates to side rails 12 of various widths. In the embodiment shown, the lower mounting plate has a sleeve 58 adapted to receive the inner end of the spacer bar 18. One or more bolts 60 pass through the sleeve 58 and the spacer bar 18 to hold the bar in place. A series of holes 62 are drilled along the spacer bar 18 to allow for inward or outward adjustment of the spacer bar 18 relative to the mounting plates 52. This allows the width of the guiding arms to be easily adjustable relative to the boat trailer, and helps ensure that the guiding mechanisms of this embodiment will be able to accommodate boats of various shapes and sizes. Alternatively, one or two highly elongated slots in the spacer bar 18 could be used.

A separate anti-twist bracket 64 is attached to the support post 26 and to a separate point on the side rail 12 by means of brackets 66. By connecting the anti-twist bracket 64 in this manner, the anti-twist bracket 64 will assist in reducing the rotation of the guiding mechanism relative to the side rail 12 and thereby further stabilize the guiding mechanism on the boat trailer. The position of the bracket 66 on the side rail 12 can easily be adjusted to accommodate adjustment of the inward or outward position of the spacer bar 18.

Figure 8:
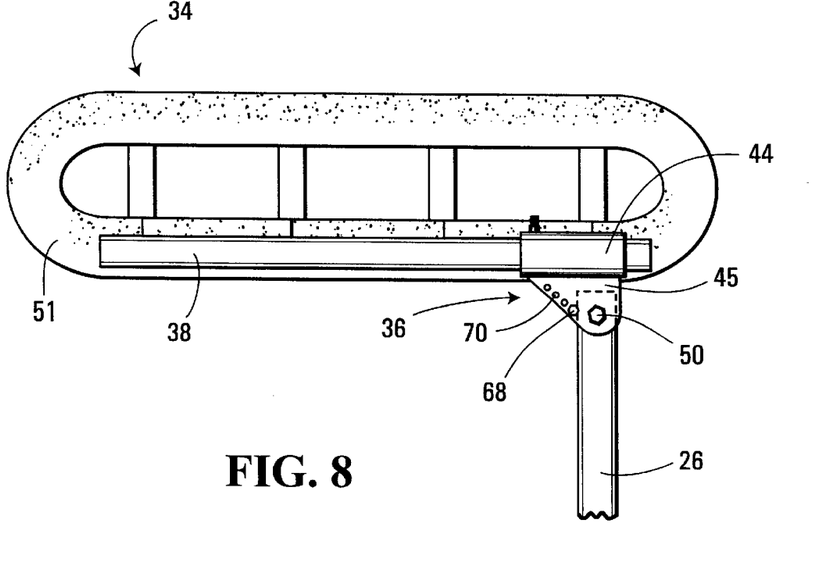
FIG. 8 is a side fragmentary view of an upper portion of another embodiment of the guiding mechanism of the present invention.

In FIG. 8, another embodiment of the present invention is shown. In this embodiment, the downward pivoting of the guiding arm 34 relative to the support post 26 is controlled by a stopping bolt 68 through the downward projections 45 of the hinge bracket 36 inside the area of downward rotation. As a result, the guiding arm 34 is only able to pivot downward relative to the support post 26 to the point where the stopping bolt 68 comes in contact with the support post 26. Thus, the guiding arms 34 can be maintained in a nearly horizontal transport position when the trailer is removed from the water, with or without the boat. Without the stopping bolt, full downward rotation of the guiding arms would occur whenever the trailer was removed from the water. A series of holes 70 in the downward projections 45 of the hinge bracket 36 allows for adjustment of the position of the stopping bolt 68 and thus adjustment of the stopping position of the guiding arm 34.

Figure 9:
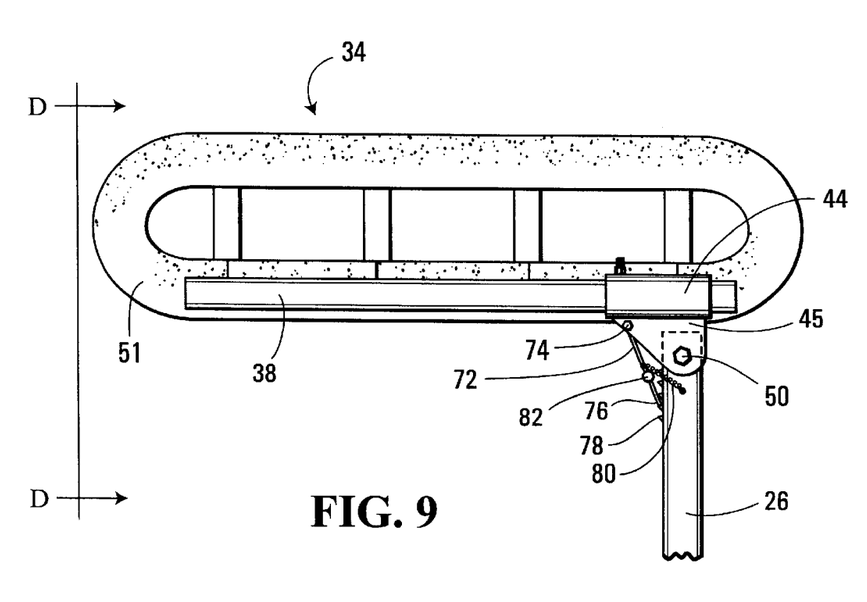
FIG. 9 is a side fragmentary view of an upper portion of yet another embodiment of the guiding mechanism of the present invention.
Figure 10:
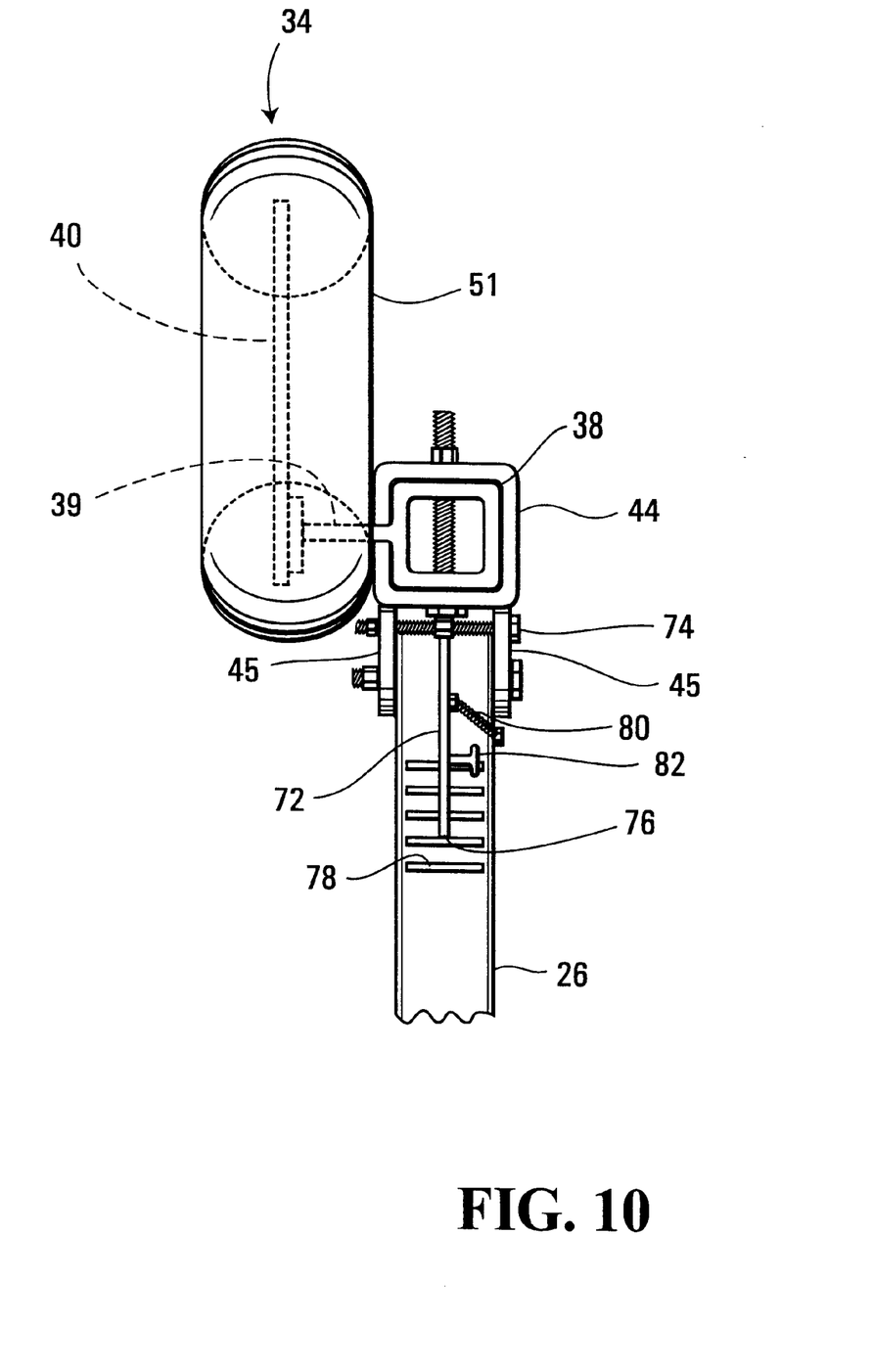
FIG. 10 is an end fragmentary view of the guiding mechanism of FIG. 9 taken along line D—D.

Alternatively, the downward rotation of the guiding arms may be controlled by a releasable ratcheting system. With reference to FIGS. 9 and 10, the releasable ratcheting system comprises a ratcheting arm 72 pivotally connected at one end to the downward projections 45 of the hinge bracket 36 by means of a pin 74 through the downward projections 45 and ratcheting arm 72. The opposite free end 76 of the ratcheting arm 72 is adapted to engage ratcheting teeth 78 on the support post 26. A spring 80 is attached to the ratcheting arm 72 and the support post 26, and is biased so as to maintain the free end 76 in releasable engagement with the ratcheting teeth 78. Thus, as the guiding arm 34 rotates upward relative to the support post 26, the ratcheting arm 72 is pulled upward so that the free end 76 engages successively higher ratcheting teeth 78, and downward rotation of the guiding arm is thus prevented by the ratcheting teeth. The free end 76 can be released from the ratcheting teeth 78 by simply applying force on a release pin 82 on the ratcheting arm 72 opposite to the biasing force of the spring 80. The guiding arm 34 is now able to rotate downward to a desired position. The free end 76 is re-engaged with the ratcheting teeth 78 by simply releasing the force on the release pin 82.

Figure 11:
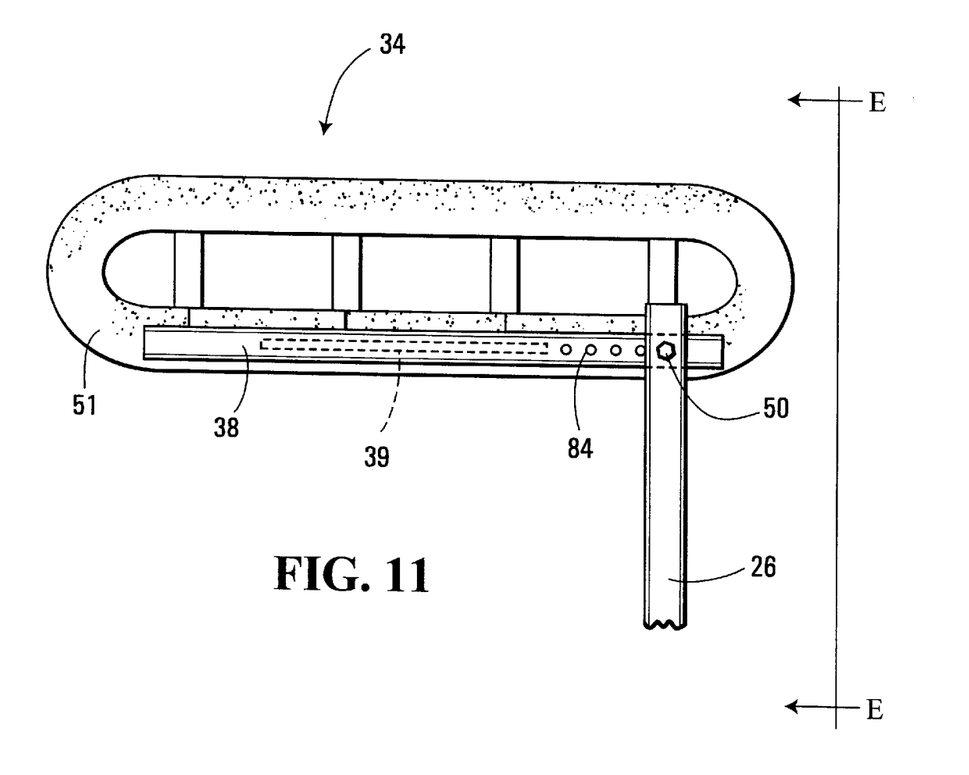
FIG. 11 is a side fragmentary view of an upper portion of another embodiment of the guiding mechanism of the present invention.
Figure 12:
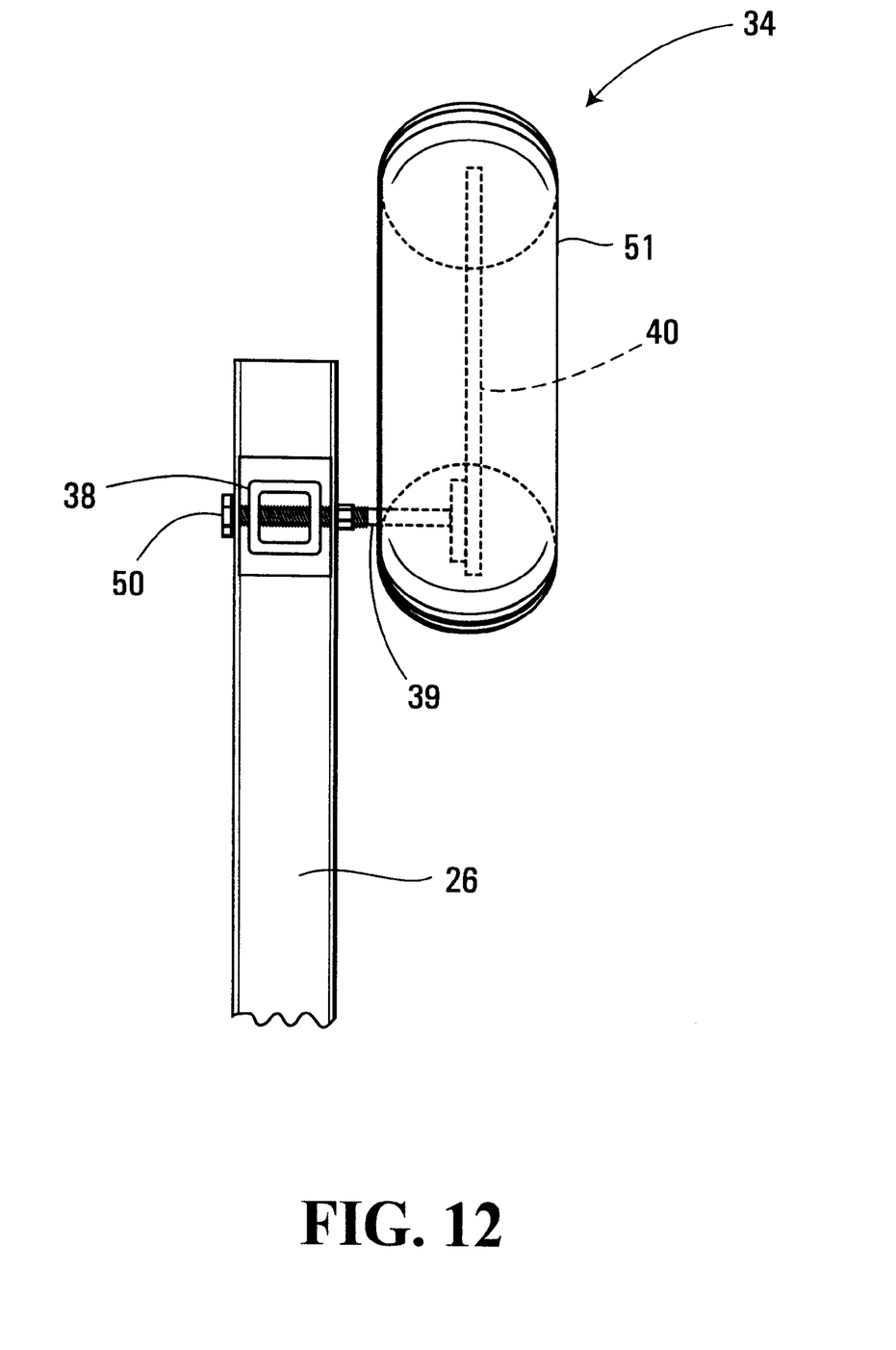
FIG. 12 is an end fragmentary view of the guiding mechanism of FIG. 11 taken along line E—E.

FIGS. 11 and 12 show another embodiment of the present invention. In this embodiment, the bracket-receiving bar 38 of the guiding arm 34 is pivotally connected directly to the support post 26 by means of a hinge pin 50. A series of holes 84 in the bracket-receiving bar 38 of the guiding arm 34 are capable of receiving the hinge pin 50. This allows for the position of the guiding arm 34 to be easily adjustable forwardly or rearwardly relative to the support post 26, and thus easily adjustable forwardly or rearwardly relative to the boat trailer. It will be generally understood that the downward rotation of the guiding arm of this embodiment may also be controllable; for example, by using the releasable ratcheting system described above adapted to fit this embodiment (not shown).

In operation, the two boat guiding mechanisms of the present invention are attached to the left and right side of a standard boat trailer by securing the mounting plates to the left and right side rails near the rear of the trailer. As discussed above, the mounting plates are able to accommodate side rails of various heights and widths. With the boat on the trailer, the position of the guiding arms relative to the boat is adjusted so the guiding arms are snug against the sides of the boat. As discussed above, the position of the guiding arms is easily adjustable in three dimensions. The most preferred position of the guiding arms will depend on the size and shape of the particular boat and the structure of the trailer being used. However, this position can easily be determined by simple experimentation with the position of the guiding arms.

When a boat trailer equipped with the guiding mechanisms of the present invention is backed down a boat ramp into the water (with or without the boat), the buoyancy of the flotation elements causes the guiding arms to pivot upward relative to the support posts so they remain approximately parallel to and near the surface of the water when the trailer has been submerged to an appropriate depth for loading or unloading a boat. As a result, the guiding arms provide a guiding surface near the rear of both sides of the trailer to prevent the stern of the boat from wandering during loading or unloading the boat from the trailer. The preferred position of the guiding arms in the water when the trailer has been submerged to an appropriate depth is just above the surface of the water. However, it will be understood that the guiding arms may also be level with or just below the surface of the water in some embodiments of the invention.

The structural components of the present invention may be constructed of steel, aluminum, plastic or any other material of sufficient size, strength and durability to perform the required functions. In the embodiment depicted, the mounting plates, spacer bar, support post, and hinge bracket were each constructed of steel, and the guiding arm was constructed of aluminum. The flotation element was constructed of foam tubing which was wrapped around and secured to the flotation support frame of the guiding arm.

While specific embodiments have been shown and described, it will be generally known that many variations are possible. For example, it will be generally understood that the size, shape and structure of the guiding mechanisms may vary considerably. In addition, the number of guiding mechanisms may also vary, as an embodiment of the invention could include more than two guiding mechanisms attachable to a boat trailer.

It will also be understood that there may be numerous other ways of connecting the various components of the invention, including the trailer attachment means to the trailer, the spacer bar to the trailer attachment means, the support post to the spacer bar, and the guiding arm to the support post. This would include connecting those components by screws, clamps, or other devices. In addition, it will be generally understood that the spacer bar and support post combination may be replaced by a single supporting member, connected to the boat trailer by a trailer attachment means. Such a supporting member could be made adjustable at the point of connection to the trailer attachment means or elsewhere by a pivot, or other adjustability mechanism, to help ensure that this embodiment would be able to accommodate boats of various shapes and sizes. Finally, it will be understood that the embodiments of the present invention could be attached directly to or form part of the boat trailer. In such a case, one or more adjustability mechanisms could be present to allow for adjustment of the position of the invention relative to the trailer. Alternatively, the invention could be customized so as to accommodate the boat that corresponds with the trailer.

The invention may be embodied in other specific forms without departing from the spirit or purpose thereof. The present embodiments are therefore to be considered as illustrative and not restrictive, the scope of the invention being indicated by the appended claims and their equivalents rather than by the foregoing description, and all changes that come within the meaning and range of equivalency of the claims are therefore intended to be embraced therein.

I claim:

1. A trailer-mounted boat guide for keeping a boat centered in the water in relation to a boat trailer during loading and unloading of said boat from said trailer, said boat guide comprising a left and a right boat guiding mechanism attachable to a left and a right side of said trailer respectively, each of said boat guiding mechanisms comprising:

a trailer mount for attaching said boat guiding mechanism to a side of said trailer;

a supporting member having a first end and a second end, said first end being connected to said trailer mount, and said second end being displaced outwardly and upwardly relative to said first end;

a guiding arm pivotally connected to said second end of said supporting member to allow said guiding arm to pivot upwardly from a transport position to a boat guiding position; and a flotation element associated with said guiding arm;

wherein said flotation element is of sufficient buoyancy, and is so associated with said guiding arm, so as to cause said guiding arm to pivot upwardly from the transport position to the boat guiding position when said trailer is submerged in the water for loading or unloading said boat from said trailer.

2. The boat guide of claim 1 wherein said trailer mount is a pair of mounting plates placed on opposite sides of a side rail on the side of said boat trailer, said mounting plates being affixed to said side rail by at least one bolt through said mounting plates, wherein at least one of said mounting plates has a sleeve to receive said first end of said supporting member, and wherein said first end is connected to said sleeve by at least one support bolt through a through hole in said sleeve and a through hole in said first end.

3. The boat guide of claim 2 wherein said first end of said supporting member has a plurality of through holes through which said support bolt can pass, wherein the position of said supporting member relative to said mounting plates is adjustable by passing said support bolt through one of said plurality of through holes in said first end of said supporting member.

4. The boat guide of claim 1 wherein the trailer mount attaches to a side rail on the side of said boat trailer, and wherein an anti-twist bracket is connected to said supporting member and said side rail, said anti-twist bracket being connected to said side rail at a different location than said trailer mount.

5. The boat guide of claim 1 wherein said guiding arm is pivotally connected to said second end of said supporting member by a pin inserted through a through hole in said guiding arm and a through hole in said second end of said supporting member.

6. The boat guide of claim 5 wherein said guiding arm has a plurality of through holes through which said pin can pass, wherein the position of said guiding arm relative to said supporting member is adjustable by passing said pin through one of said plurality of through holes in said guiding arm.

7. The boat guide of claim 1 wherein said boat guiding mechanism has a rotational control mechanism for controlling downward rotation of said guiding arm relative to said supporting member.

8. The boat guide of claim 7 wherein the rotational control mechanism comprises a ratcheting arm having a connected end and a free end, said connected end being pivotally connected to said guiding arm, said free end being adapted to engage ratcheting teeth on said supporting member, wherein said free end is biased to releasably engage said ratcheting teeth.

9. The boat guide of claim 8 wherein said free end is biased to releasably engage said ratcheting teeth by a spring attached to said ratcheting arm and said supporting member, wherein said bias of said spring maintains said free end in engagement with said ratcheting teeth, and wherein force applied to said ratcheting arm opposite to said bias of said spring will disengage said free end from said ratcheting teeth.

10. The boat guide of claim 1 wherein said supporting member comprises a substantially horizontal spacer bar having a first end and a second end, and a substantially vertical support post having a first end and a second end, said first end of said spacer bar being connected to said trailer mount, said second end of said spacer bar being connected to said first end of said support post, said guiding arm being pivotally connected to said second end of said support post.

11. The boat guide of claim 10 wherein said second end of said spacer bar has a sleeve to receive said first end of said support post, said second end of said spacer bar being connected to said first end of said support post by at least one bolt through a through hole in said sleeve and a through hole in said first end of said support post.

12. The boat guide of claim 11 wherein said first end of said support post has a plurality of through holes through which said bolt can pass, wherein the position of said support post relative to said spacer bar is adjustable by passing said bolt through one of said plurality of through holes in said first end of said support post.

13. The boat guide of claim 1 wherein said guiding arm is pivotally connected to said second end of said supporting member by means of a hinge bracket connected to said guiding arm and pivotally connected to said supporting member.

14. The boat guide of claim 13 wherein said hinge bracket is pivotally connected to said supporting member by means of a pin through a through hole in said hinge bracket and a through hole in said supporting member.

15. The boat guide of claim 13 wherein said hinge bracket has a sleeve to receive said guiding arm, said guiding arm being connected to said hinge bracket by at least one bolt through a through hole in said guiding arm and a through hole in said sleeve.

16. The boat guide of claim 15 wherein said guiding arm has a plurality of through holes through which said bolt can pass, wherein the position of said guiding arm relative to said hinge bracket is adjustable by passing said bolt through one of said plurality of through holes in said guiding arm.

17. The boat guide of claim 13 wherein said hinge bracket has an upper portion comprising a sleeve to receive said guiding arm, said sleeve having an inward and an outward side, said guiding arm being connected to said hinge bracket by at least one bolt through a through hole in said sleeve and a through hole in said guiding arm, and a lower portion comprising a first projection extending downwardly from said inward side of said sleeve and a second projection extending downwardly from said outward side of said sleeve, said first and second projections being substantially parallel, each of said projections having a pivoting section and a stopping section, said pivoting sections being adapted to receive said second end of said supporting member, said hinge bracket being pivotally connected to said supporting member by means of a pin through through holes in said pivoting sections and a through hole in said second end of said supporting member.

18. The boat guide of claim 17 wherein said guiding arm has a plurality of through holes through which said bolt can pass, wherein the position of said guiding arm relative to said hinge bracket is adjustable by passing said bolt through one of said plurality of through holes in said guiding arm.

19. The boat guide of claim 18 wherein said boat guiding mechanism has a rotational control mechanism for controlling downward rotation of said guiding arm relative to said supporting member.

20. The boat guide of claim 19 wherein said rotational control mechanism is a bolt through through holes in said stopping sections, wherein the downward rotation of said guiding arm relative to said supporting member is restricted by contact between said bolt and said supporting member.

21. The boat guide of claim 20 wherein said stopping sections have a plurality of through holes through which said bolt can pass, wherein the rotational position of said guiding arm relative to said supporting member at which point downward rotation is restricted is adjustable by passing said bolt through one of said plurality of through holes in said stopping sections.

22. The boat guide of claim 1 wherein said flotation element is at least one buoyant foam cylinder.

23. The boat guide of claim 1 wherein said flotation element is brightly coloured.

24. A boat trailer, comprising a boat frame, a vehicle attachment connected to said frame, a plurality of wheels connected to said frame, and a left and right boat guiding mechanism near the rear of each of a left and right side of said frame respectively, for keeping a boat centered in the water during loading and unloading of said boat from said trailer, each of said boat guiding mechanisms comprising:

a supporting member having a connected end and a second end, said connected end being attached to said frame, and said second end being displaced outwardly and upwardly relative to said connected end;

a guiding arm pivotally connected to said second end of said supporting member to allow said guiding arm to pivot upwardly from a transport position to a boat guiding position; and a flotation element associated with said guiding arm;

wherein said flotation element is of sufficient buoyancy, and is so associated with said guiding arm, so as to cause said guiding arm to pivot upwardly from the transport position to the boat guiding position when said trailer is submerged in the water for loading or unloading said boat from said trailer.

* * * * *